United States Patent [19]

Magana et al.

[11] Patent Number: 6,021,314
[45] Date of Patent: Feb. 1, 2000

[54] FREE CHANNEL SELECTOR FOR SELECTING AN OPTIMAL CHANNEL

[75] Inventors: Javier V. Magana; Steve Hebeler, both of Austin, Tex.

[73] Assignee: Advanced Micro Devices, Inc.

[21] Appl. No.: 08/861,963

[22] Filed: May 22, 1997

[51] Int. Cl.[7] ...................................................... H04Q 7/20
[52] U.S. Cl. ........................ 455/62; 455/226.1; 455/450
[58] Field of Search ............................... 455/62, 63, 450, 455/451, 452, 517, 67.1, 226.1, 513

[56] References Cited

U.S. PATENT DOCUMENTS

| | | |
|---|---|---|
| 5,655,002 | 8/1997 | Proctor et al. ............................. 455/450 |
| 5,745,853 | 4/1998 | Hippelainen ............................. 455/450 |
| 5,809,427 | 9/1998 | Perreault et al. ......................... 455/450 |

*Primary Examiner*—Nguyen Vo
*Assistant Examiner*—Sam Bhattacharya

[57] ABSTRACT

A free channel selector for selecting from a plurality of channels an optimal channel for establishing radio communication. The channels may be selected by a radio frequency (RF) module for outputting sampled signals carried on that channel. The selected signals are digitized and provided to a peak detector. The peak detector compares the strength of the signals from the various channels. A memory device, having an array of cells, is provided for storing values representative of the sampled signals of each of the plurality of channels, each of the stored values being stored in a cell having an address indicative of the channel on which the signal represented by the stored value is carried. A stored value corresponding to the lowest signal strength is selected as being the free channel. Communication will then occur over that channel.

29 Claims, 4 Drawing Sheets

FREE CHANNEL SELECTOR FOR SELECTING AN OPTIMAL CHANNEL

BACKGROUND OF THE INVENTION

1. Field of the Invention

The present invention relates to an apparatus and method for cordless telephonic communication and, more particularly, for selecting a free channel for such communication.

2. Brief Description of Related Technology

Cordless, or wireless, telephones typically include a base station and a separate handset unit which is typically adapted to be seated in a cradle formed in the base station. The general operation of the wireless telephone is controlled by a micro controller integrated therein. Such telephones are commonly capable of operating, i.e., transmitting and receiving signals, on any one of a number of separate channels. A radio frequency (RF) module is typically utilized by the micro controller for establishing communication on a single channel, the selection of which channel is discussed below. Time division multiplexing, such as duplexing, may be utilized to both transmit and receive signals on the same channel. Transmit and receive time slots are allocated so signals are alternately transmitted and received, respectively, in the different time slots. The transmit and receive time slots are of substantially equal duration and may be non-overlapping.

To select a channel for communication, the telephone automatically samples signals from each channel to determine which channel is free, i.e., has the least amount of signal traffic on it. The free channel selection is performed according to a predefined algorithm. One example may be that each of the channels is examined, or sampled, for radio frequency activity for a period of time from between 200 milliseconds (ms) to 2 seconds. The channel with the lowest radio frequency activity is the optimum channel to be used to establish a radio link between the handset unit and the base station. The signal samples, however, are valid for only a predetermined period of time. Therefore, all channels must be sampled and re-examined repeatedly.

The free channel selection function is performed typically by the micro controller according to software instructions stored therein. Accordingly, the micro controller sets the RF module to a particular channel. In one embodiment, the signal is then sampled at least tour times during a 2 ms transmit/receive window. A Receive Signal Strength Indicator (RSSI) circuit then provides the strength of the signal samples. The micro controller reads the RSSI level for the signals of each channel and, using conventional comparison techniques, selects for radio communication the channel having the lowest RSSI level.

A disadvantage of the foregoing process and system is that substantial overhead is added to the micro controller, which inhibits the micro controller from performing other system tasks. Another disadvantage of the foregoing process is that it also shortens the life of the battery in the handset unit. One solution to this drawback is to use a faster, more powerful micro controller which can manage the additional overhead. But, such a micro controller increases the cost of the telephone and increases the power requirement to operate it. Since the handset of a cordless telephone draws its power from a battery, increased power demands drain the battery faster, thereby decreasing the operating time.

Therefore, what is needed is an apparatus and method in which the free channel selection of a cordless telephone is performed without unduly burdening the micro controller and without requiring increased amounts of power.

SUMMARY OF THE INVENTION

The present invention, accordingly, provides an apparatus and method in which the free channel selection of a cordless telephone is performed without unduly burdening the micro controller and without requiring increased amounts of power. To this end, a free channel selector of the present invention comprises an A/D converter which digitizes the RSSI signal from a radio frequency (RF) module for a selected and monitored channel. The A/D converter generates, for each of a plurality of channels, a first signal indicative of the strength of the signals transmitted on the respective channel, and an end of conversion (EOC) signal. The first signal and the EOC signal are then provided to a peak detector circuit which compares the strength of the first signal to the signal strength of a previously selected channel. A memory device having an array of cells is provided for storing values representative of the signal strength of the channel having the least signal activity, where the stored values stored in a cell having an address indicative of the channel on which the first signal represented by the stored value is carried. The address of the selected stored value is indicative of the free channel.

An advantage achieved with the present invention is that it enables the use of relatively inexpensive micro controllers that require relatively little power in cordless telephones, thereby extending battery life and the operating time of the telephone.

Another advantage achieved with the present invention is that it frees up the micro controller to perform other tasks while the free channel selection process is being performed.

DETAILED DESCRIPTION OF THE PREFERRED EMBODIMENT

Figure 1:
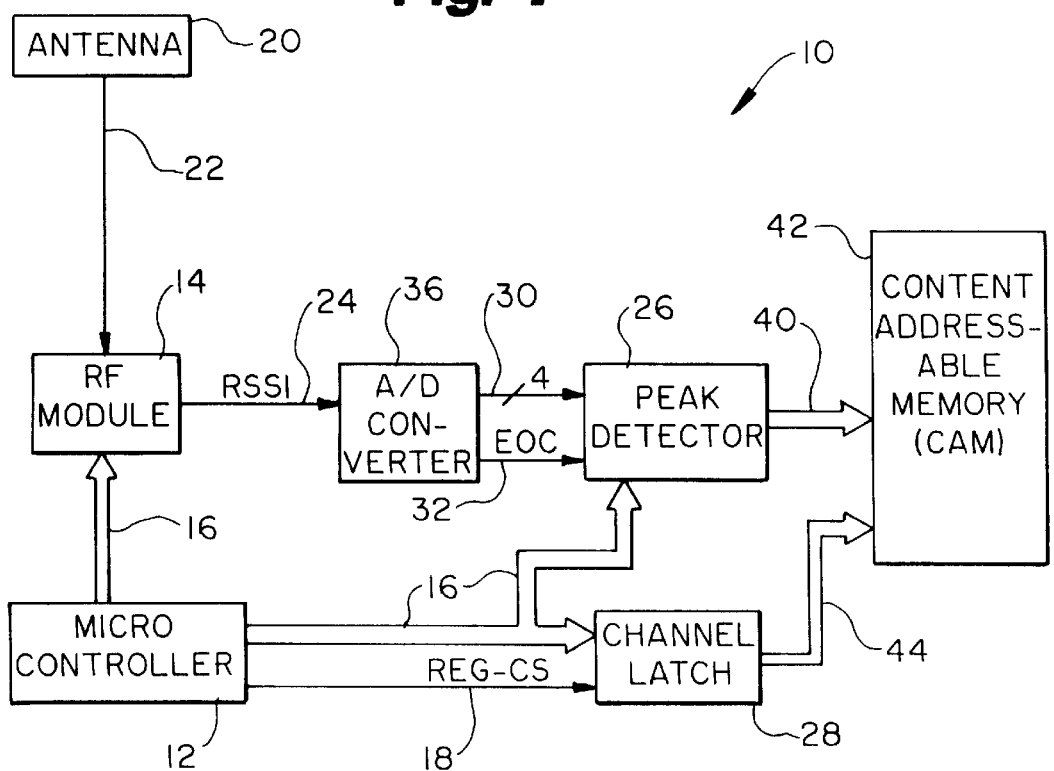
FIG. 1 is a schematic diagram of the free channel selector of the present invention.

Referring to FIG. 1, an embodiment of the free channel selector of the present invention is shown. The selector 10 forms a portion of a cordless telephone system, not shown in its entirety, but which is well known in the art. It is understood that the general operation of the telephone is controlled by a micro controller 12 in a manner well known to those skilled in the art.

The selector 10 includes a radio frequency (RF) module 14 electrically connected to the micro controller 12 via a micro controller bus 16 for receiving control signals for setting the RF module to a particular channel. An antenna 20, configured for receiving radio signals on the numerous channels on which the telephone operates, preferably forty channels, communicates the received radio signals via a line 22 to an input of the RF module 14. The RF module 14 includes a bandpass filter (not shown) which passes that portion of the signal carried by the selected channel. The analog signal carried on the selected channel is then output from RF module 14, via line 24, to an analog-to-digital (A/D) converter circuit 36. Suitable A/D converters are shown in the art.

The peak detector 26 is connected to the A/D converter 36 via two lines 30 and 32 for receiving, respectively, a 4-bit digitized signal in this example and an end of conversion (EOC) signal. During a time interval between the receipt of a start signal and a subsequent stop signal, the peak detector 26 samples the signal on the line 30.

Figure 3:
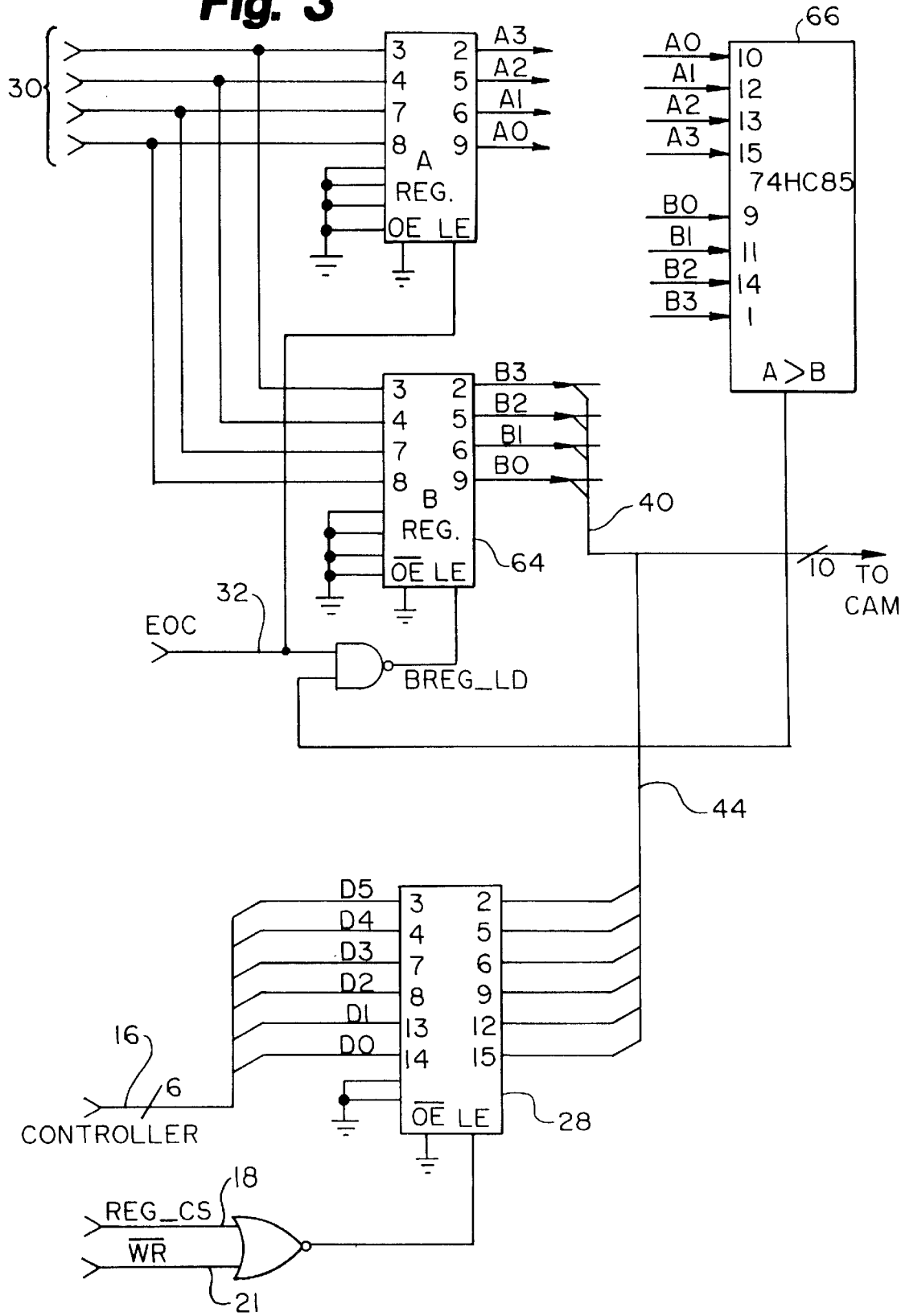
FIG. 3 is an embodiment of the peak detector circuit of the present invention.

Peak detector 26 is preferably implemented as follows. Referring to FIG. 3, a 4-bit input from A/D converter 36, on line 30, which represents the digitized analog signal sampled from antenna 20 by RF module 14 is input to a pair of registers 62 and 64. End of conversion signal (EOC) on line 32 from the A/D converter is used to latch in to register 62 the 4-bit signal at the end of each conversion of A/D converter 36. Register 64, meanwhile, holds the value of the signal having the highest value up to this point. The outputs of registers 62 and 64 are input to a comparator circuit 66 which compares the output of register 62, the incoming signal sample, with the output of register 64, the previously highest signal value. If the incoming signal is higher than the previous signal held in register 64, an enable signal from the comparator is ANDed with the EOC signal 32 from A/D converter 30 and the new signal value is input into register 64 as the new highest value signal. The output of register 64, aside from being input to comparator 66, is provided to a content addressable memory (CAM) 42.

The CAM 42 is connected to bus 40 for receiving the 4-bits of data from register 64. The CAM 42 includes numerous Cells (not shown) for storing the data received on the bus 40. The CAM 42 is also connected to a bus 44 for receiving control signals and address data bits from the controller 12, via channel latch 28. The address from the controller 12 corresponds to the channel number for the RF channel being sampled. The control signals received on the bus 44 include enabling signals directing the CAM 42 to, respectively, write data to a cell via REG-CS signal 18, search for a data cell address, and output data to the micro controller bus 16 via signal WR 21. It is understood that the CAM 42 can search the contents of the cells and return the address and contents of the cell having the lowest value stored therein, which address can be readily converted to a corresponding channel number. Because CAMs are well known to those skilled in the art, the operation of the CAM 42 will not be described in further detail.

The controller 12, furthermore, includes a memory (not shown) for storing control logic instructions, a counter (not shown) for storing a six bit number representing the channel being sampled and an address in the CAM 42, and a clock (not shown). Suitable controllers are known in the art.

Figure 2A:
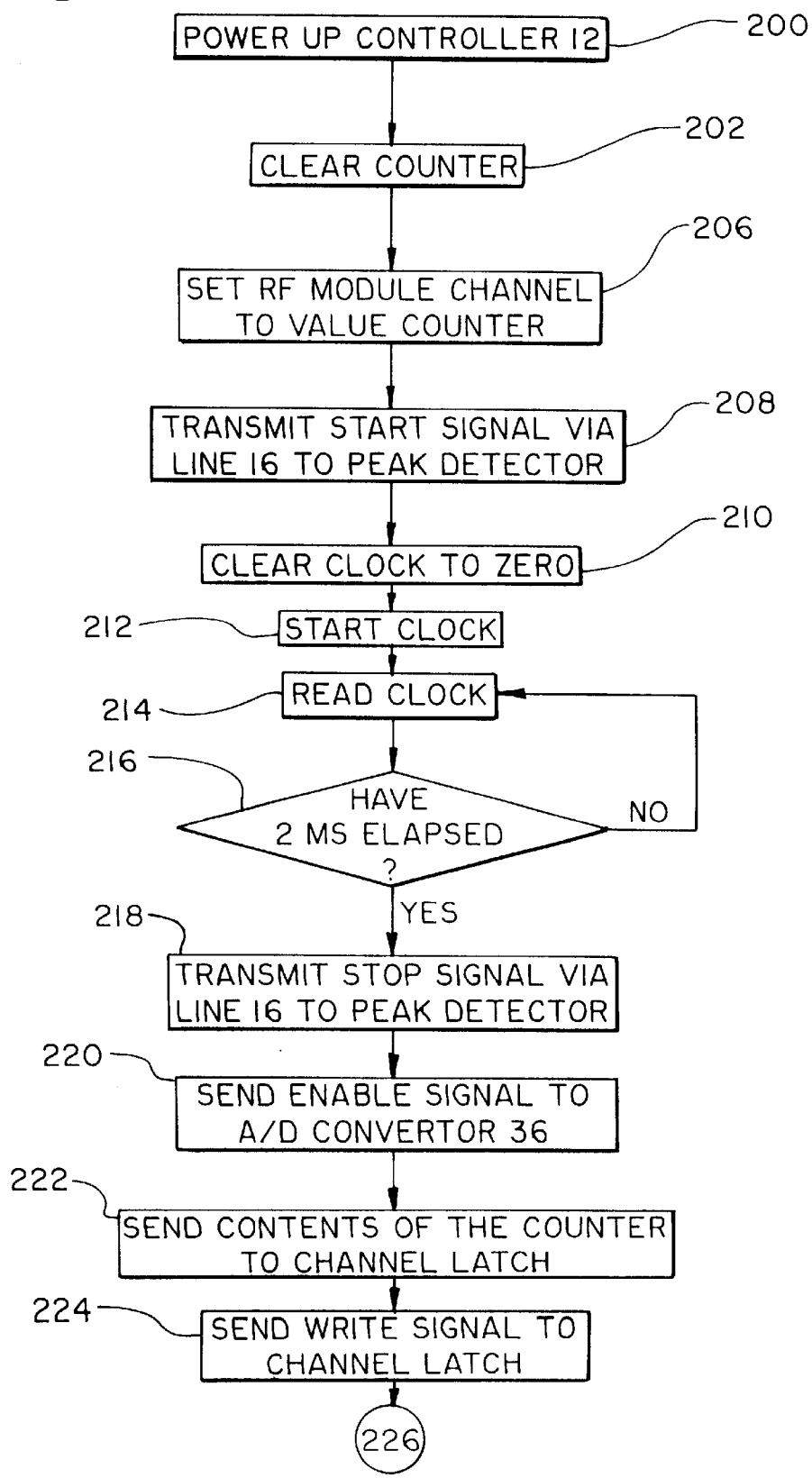
FIG. 2 is a flow chart illustrating control logic for operating a controller of the free channel selector of FIG. 1.
Figure 2B:
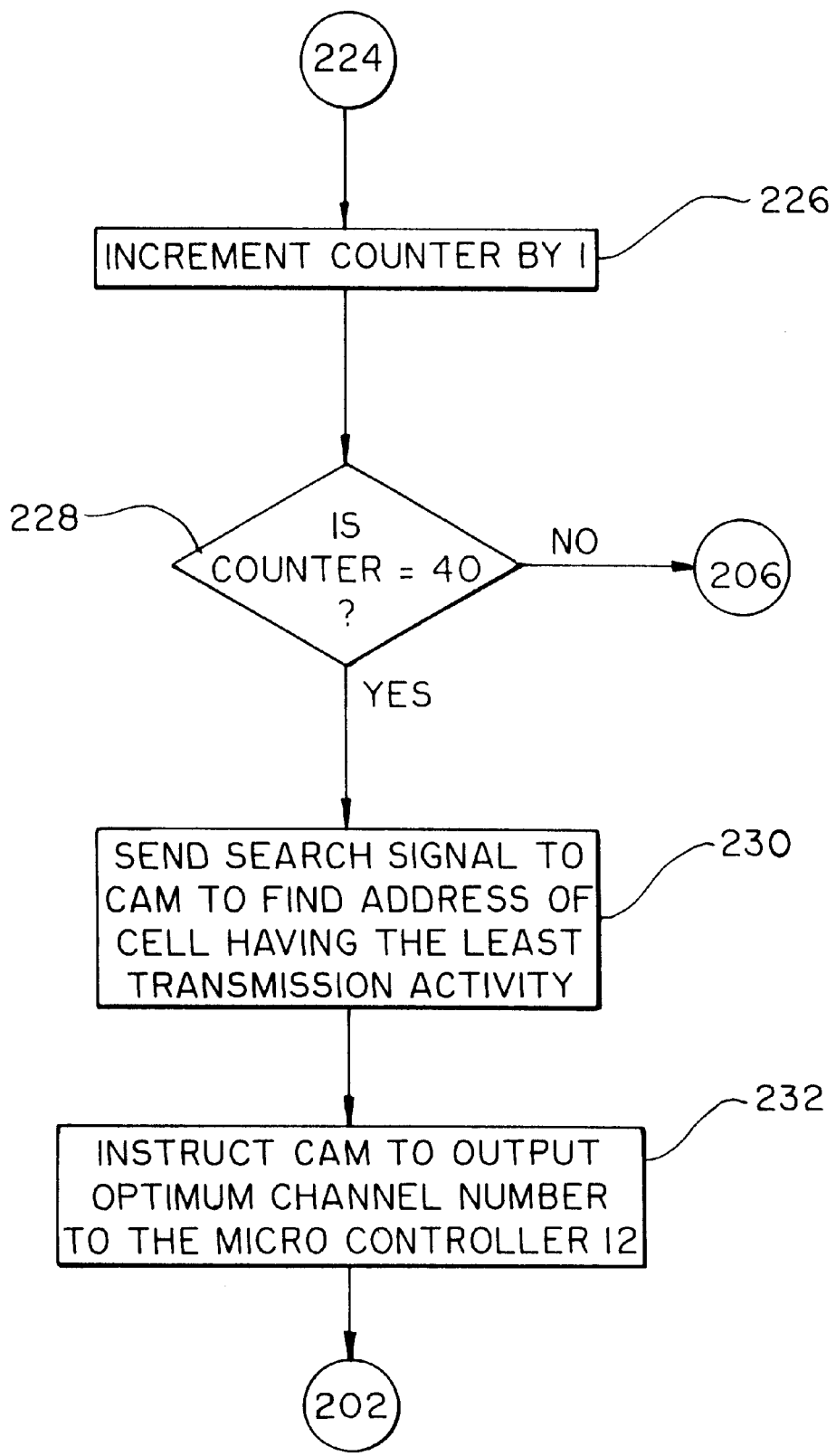

FIG. 2 is a flow chart illustrating control logic for operating the free channel selector 10 in accordance with the present invention. It is understood that the logic may he implemented by instructions stored in the controller memory.

In step 200, the controller 12 is powered up and, in step 202, the counter is cleared to zero.

In step 206, the controller 12 sets the RF module 14 to the channel indicated by the transmitted value of the counter. Hence, the R-F module 14 will be initially set to channel 0.

In step 208, the controller 12 transmits a start signal via the line 16 to the peak detector 26, thereby causing the detector to start sampling the signal on the line 30 and to determine the maximum RSSI level of the signal thereon. In step 210, the clock is cleared to zero and, in step 212, the clock is started. In step 214, the controller 12 reads the clock to determine whether 2 ms have elapsed. If a determination is made that 2 ms have not elapsed, then execution returns to step 214; otherwise, execution proceeds to step 218. In step 218, a stop signal is transmitted via the line 16 to the peak detector 26, thereby causing the peak detector to stop sampling and to output the maximum RSSI detected onto the line 40.

In step 220, the controller 12 transmits an enable signal to the A/D converter 36 to cause it to receive the signal on the line 24, to convert it to a digital signal, and to then output the digital signal onto the line 30. In step 222, the controller 12 transmits the contents of the counter to the CAM 42. In step 224, the controller 12 transmits, via the bus 16, a write signal to the channel latch 28 instructing the latch 28 to write the data represented by the digital signal on the bus 40 to the cell having an address specified by the value on the bus 44, which is the value of the counter. It is understood that the cell address may also be specified by an offset to the value of the counter.

In step 226, the controller 12 increments the counter by one. In step 228, a determination is made whether the counter is equal to the highest channel number, which preferably is 40. If it is determined that the counter is not equal to the highest channel number, then execution returns to step 206. If it is determined that the counter is equal to 40, then execution proceeds to step 230.

In step 230, the controller 12 transmits a search signal to the CAM 42 directing it to search the cells of its memory and determine the address of the cell having the value representing the lowest RSSI level on a channel. It can be appreciated that the address of the cell having the lowest RSSI level represents the optimal channel on which the telephone should operate. In step 232, the controller 12 transmits a signal to the CAM 42 to output onto the bus 44 to the controller 12, via channel latch 28, the number of the optimal channel for communication. Execution then returns to step 202.

The present invention has several advantages. For example, relatively inexpensive micro controllers that require relatively little power may be used in cordless telephones, thereby extending battery life and the usefulness of the telephone. Further, the micro controller is treed tip to perform other tasks while the free channel selection process is being performed. Moreover, the foregoing advantages are achieved without requiring any significant additional power to operate the telephone.

It is understood that several variations may be made in the foregoing without departing from the scope of the invention. For example, the CAM 42 may he configured to store as coupled pairs the channel numbers together with their respective signal strengths and to sort the pairs according to their signal strengths in either ascending or descending order. The optimal channel would then be that channel in either the highest or lowest memory cell.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A free channel selector for selecting from a plurality of channels an optimal channel for establishing radio communication, each of which channels may be selected by a radio frequency (RF) module for outputting signals carried on that channel, the free channel selector comprising:

a peak detector electrically connectable for receiving signals output from the RF module and for generating, for each of the plurality of channels, a first signal indicative of the strength of the signals transmitted on the respective channel;

means for generating, for each of the plurality of channels, a second signal indicative of the respective channel;

memory means electrically connected for receiving first and second signals from the peak detector and the generating means, respectively, the memory means having an array of cells for storing first and second values representative of the first and second signals, respectively, for each of the plurality of channels so that the first and second values are stored in association with one another;

means electrically connected to the memory means for selecting one of the stored first values corresponding to a desired signal strength;

means electrically connected to the selecting means and the memory means for determining the second value stored in association with the selected one of the stored first values; and means electrically connected to the memory means and to the determining means for identifying the channel indicated by the determined second value, the identified channel being the free channel.

2. The selector of claim 1 wherein the peak detector includes a Received Signal Strength Indicator (RSSI) circuit for determining the strength of received signals.

3. The selector of claim 1 wherein the peak detector includes a converter for converting each first signal from an analog signal to a digital signal.

4. The selector of claim 1 wherein the memory means, the selecting means, the determining means, and the identifying means are integrated into a content addressable memory.

5. The selector of claim 4 further comprising a controller electrically connected for controlling the activity of the peak detector and the content addressable memory.

6. The selector of claim 1 wherein the selecting means sorts the first values in a predetermined order so that the stored first value corresponding to a desired signal strength is in a predetermined cell.

7. The selector of claim 1 wherein each of the plurality of channels is identified by a first number and the address of each of the cells is identified by a second number equal to the sum of a channel number and an offset.

8. The selector of claim 1 wherein the selecting means is a comparator.

9. The selector of claim 1 wherein the desired signal strength is a minimum signal strength.

10. The selector of claim 1 wherein the RF module receives signals from an antenna configured for receiving signals transmitted on the plurality of channels.

11. An apparatus for selecting a free channel for use between a cordless telephone handset and a base unit from a plurality of possible channels, wherein the handset and base unit communicate on each of the possible channels using a communication frame consisting of a transmit window followed by a receive window, comprising:

means for selecting one of the possible channels during a time segment for each of the possible channels;

means for setting an RF module to the selected channel during a time segment for each of the possible channels;

means for measuring a value of the received signal strength for the selected channel using a peak signal detection for a second period of time during a time segment for each of the possible;

means for storing the signal strength value within a content addressable memory during a time segment for each of the possible channels;

means for continually selecting the channel corresponding to an oldest stored value and repeating the steps of setting the RF module to the selected channel, measuring the received signal strength value, and storing the signal strength value while the handset and base unit are not in use and after a delay of a third period of time; and means for reading the channel number from the content addressable memory which possesses a minimum measured value when the free channel is required for using in establishing communications between the handset and the base unit; and means for using the read channel for communication between the handset and the base unit.

12. The apparatus according to claim 11, wherein the received signal strength measurement is performed within the handset.

13. The apparatus according to claim 11, wherein the received signal strength measurement is performed within the base unit.

14. The apparatus according to claim 12, wherein the desired measured value corresponds to a minimum measured value stored within the content addressable memory.

15. The apparatus according to claim 14, wherein the handset and base unit communicate using CT2 interface specification.

16. The apparatus according to claim 11, wherein the desired measured value corresponds to a measured value stored within the content addressable memory which is less than a threshold.

17. A free channel selection method for selecting from a plurality of channels an optimal channel for establishing radio communication, each of which channels may be selected by a radio frequency (RF) module for outputting signals carried on that channel, the free channel selection method comprising:

receiving signals output from the RF module and generating, for each of the plurality of channels, a first signal indicative of the strength of the signals transmitted on the respective channel;

generating, for each of the plurality of channels, a second signal indicative of the respective channel;

storing first and second values representative of the first and second signals, respectively, for each of the plurality of channels so that the first and second values are stored in association with one another;

selecting one of the stored first values corresponding to a desired signal strength;

identifying the channel indicated by the determined second value, the identified channel being the free channel.

18. The method of claim 17 wherein the first instance of receiving and generating includes using a Received Signal Strength Indicator (RSSI) circuit and determining the strength of received signals.

19. The method of claim 18 further including converting each first signal from an analog signal to a digital signal.

20. The method of claim 18 further including sorting the first values in a predetermined order so that the stored first value corresponding to a desired signal strength is in a predetermined location.

21. The method of claim 18 wherein each of the plurality of channels is identified by a first number and the address of each of the cells is identified by a second number equal to the sum of a channel number and an offset.

22. The method of claim 18 wherein the desired signal strength is a minimum signal strength.

23. The method of claim 18 wherein the RF module receives signals from an antenna configured for receiving signals transmitted on the plurality of channels.

24. A method for selecting a free channel for use between a cordless telephone handset and a base unit from a plurality of possible channels, wherein the handset and base unit communicate on each of the possible channels using a communication frame consisting of a transmit window followed by a receive window, comprising:

- selecting one of the possible channels during a time segment for each of the possible channels;
- setting an RF module to the selected channel during a time segment for each of the possible channels;
- measuring a value of the received signal strength for the selected channel using a peak signal detection for a second period of time during a time segment for each of the possible;
- storing the signal strength value within a content addressable memory during a time segment for each of the possible channels;
- continually selecting the channel corresponding to an oldest stored value and repeating the steps of setting the RF module to the selected channel, measuring the received signal strength value, and storing the signal strength value while the handset and base unit are not in use and after a delay of a third period of time;
- reading the channel number from the content addressable memory which possesses a minimum measured value when the free channel is required for using in establishing communications between the handset and the base unit; and
- using the read channel for communication between the handset and the base unit.

25. The method according to claim 24, wherein the received signal strength measurement is performed within the handset.

26. The method according to claim 24, wherein the received signal strength measurement is performed within the base unit.

27. The method according to claim 24, wherein the desired measured value corresponds to a minimum measured value stored within the content addressable memory.

28. The method according to claim 24, wherein the handset and base unit communicate using CT2 interface specification.

29. The method according to claim 24, wherein the desired measured value corresponds to a measured value stored within the content addressable memory which is less than a threshold.

* * * * *

UNITED STATES PATENT AND TRADEMARK OFFICE
CERTIFICATE OF CORRECTION

PATENT NO. : 6,021,314

DATED : February 1, 2000

INVENTOR(S) : MAGANA et al.

It is certified that error appears in the above-identified patent and that said Letters Patent is hereby corrected as shown below:

Col. 1, line 46: "tour" should read --four--.

Col. 4, line 40: "treed tip" should read --freed up--.

Signed and Sealed this

Twenty-seventh Day of March, 2001

Attest:

NICHOLAS P. GODICI

Attesting Officer

Acting Director of the United States Patent and Trademark Office